(12) United States Patent
Bradicich et al.

(10) Patent No.: US 8,566,028 B2
(45) Date of Patent: Oct. 22, 2013

(54) APPARATUS, SYSTEM, AND METHOD FOR AUTONOMOUSLY DETERMINING A SET OF DESTINATIONS

(75) Inventors: Thomas Michael Bradicich, Apex, NC (US); Richard Edwin Harper, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 11/563,606

(22) Filed: Nov. 27, 2006

(65) Prior Publication Data

US 2008/0125968 A1 May 29, 2008

(51) Int. Cl.
*G01C 21/00* (2006.01)

(52) U.S. Cl.
USPC ........... 701/426; 701/400; 701/428; 701/438; 701/431

(58) Field of Classification Search
USPC ................ 711/212; 701/211, 117, 208, 207, 701/200, 201, 202, 206; 235/384; 340/905, 340/932.2; 704/275
See application file for complete search history.

(56) References Cited

U.S. PATENT DOCUMENTS

| | | | | |
|---|---|---|---|---|
| 5,103,400 A | * | 4/1992 | Yamada et al. | 701/533 |
| 5,291,413 A | * | 3/1994 | Tamai et al. | 701/416 |
| 5,291,414 A | * | 3/1994 | Tamai et al. | 701/416 |
| 5,303,159 A | * | 4/1994 | Tamai et al. | 701/416 |
| 5,614,898 A | * | 3/1997 | Kamiya et al. | 340/995.24 |
| 5,757,289 A | * | 5/1998 | Nimura et al. | 340/995.21 |
| 5,774,073 A | * | 6/1998 | Maekawa et al. | 340/995.21 |
| 5,809,565 A | | 9/1998 | Vincken | 711/212 |
| 5,835,881 A | | 11/1998 | Trovato et al. | 701/211 |
| 5,864,125 A | | 1/1999 | Szabo | 235/384 |
| 5,900,825 A | | 5/1999 | Pressel et al. | 340/905 |
| 5,906,654 A | * | 5/1999 | Sato | 701/418 |
| 5,964,821 A | | 10/1999 | Brunts et al. | |
| 5,999,879 A | * | 12/1999 | Yano | 701/454 |
| 6,018,697 A | * | 1/2000 | Morimoto et al. | 701/411 |
| 6,049,753 A | | 4/2000 | Nimura | 701/428 |
| 6,076,041 A | * | 6/2000 | Watanabe | 701/437 |
| 6,118,389 A | * | 9/2000 | Kamada et al. | 340/995.21 |
| 6,128,571 A | * | 10/2000 | Ito et al. | 701/426 |
| 6,144,318 A | * | 11/2000 | Hayashi et al. | 340/995.19 |

(Continued)

OTHER PUBLICATIONS

SafeGuardian One Button Safety GPS Cell phone, http://web.archive.org/web/20060209011401/http://www.safeguardian.com/, Feb. 9, 2006.

*Primary Examiner* — Bhavesh V Amin
(74) *Attorney, Agent, or Firm* — Kunzler Law Group

(57) ABSTRACT

An apparatus, system, and method are disclosed for autonomously determining a set of destinations. A landmark module stores a plurality of landmarks from a database. An identification module identifies a first current location and direction of the vehicle. In response to receiving a help command from the help button, a destination module determines a first set of destinations from the plurality of landmarks, the first current location, and the first current direction. A prompt module audibly prompts a driver to navigate the vehicle to the first set of destinations. A navigation module determines if the driver is navigating towards the first direction. In response to the driver not navigating the vehicle toward at least one destination of the first set of destinations, the navigation module may direct the identification module to identify a second current location and direction of the vehicle and the destination module to determine a second set of destinations.

18 Claims, 6 Drawing Sheets

(56) References Cited

U.S. PATENT DOCUMENTS

| | | | |
|---|---|---|---|
| 6,188,957 B1* | 2/2001 | Bechtolsheim et al. | 701/446 |
| 6,199,014 B1* | 3/2001 | Walker et al. | 701/428 |
| 6,232,915 B1* | 5/2001 | Dean et al. | 342/357.31 |
| 6,249,740 B1* | 6/2001 | Ito et al. | 701/420 |
| 6,266,614 B1 | 7/2001 | Alumbaugh | 701/211 |
| 6,269,304 B1* | 7/2001 | Kaji et al. | 701/533 |
| 6,317,682 B1 | 11/2001 | Ogura et al. | 701/117 |
| 6,347,278 B2* | 2/2002 | Ito | 701/411 |
| 6,356,836 B1* | 3/2002 | Adolph | 701/410 |
| 6,356,837 B1* | 3/2002 | Yokota et al. | 701/411 |
| 6,360,168 B1* | 3/2002 | Shimabara | 701/436 |
| 6,381,524 B1* | 4/2002 | Kuragaki et al. | 701/36 |
| 6,393,360 B1 | 5/2002 | Ma | 701/208 |
| 6,405,130 B1* | 6/2002 | Piwowarski | 701/411 |
| 6,405,132 B1* | 6/2002 | Breed et al. | 701/301 |
| 6,411,895 B1* | 6/2002 | Lau et al. | 701/425 |
| 6,415,291 B2 | 7/2002 | Bouve et al. | |
| 6,434,482 B1* | 8/2002 | Oshida et al. | 701/426 |
| 6,477,460 B2* | 11/2002 | Kepler | 701/426 |
| 6,480,786 B2* | 11/2002 | Watanabe et al. | 701/438 |
| 6,529,143 B2* | 3/2003 | Mikkola et al. | 340/995.1 |
| 6,542,814 B2* | 4/2003 | Polidi et al. | 701/454 |
| 6,564,143 B1* | 5/2003 | Alewine et al. | 701/438 |
| 6,609,064 B1* | 8/2003 | Dean | 701/454 |
| 6,636,801 B2 | 10/2003 | Curbow | 701/207 |
| 6,650,999 B1* | 11/2003 | Brust et al. | 701/517 |
| 6,671,615 B1* | 12/2003 | Becker et al. | 701/516 |
| 6,721,655 B1* | 4/2004 | Utsumi | 701/418 |
| 6,778,905 B2* | 8/2004 | Horikami | 701/468 |
| 6,789,065 B2 | 9/2004 | Berner et al. | 704/275 |
| 6,901,330 B1 | 5/2005 | Krull et al. | |
| 7,188,070 B2* | 3/2007 | Dar et al. | 705/13 |
| 7,233,861 B2* | 6/2007 | Van Buer et al. | 701/424 |
| 2002/0035430 A1* | 3/2002 | Yano et al. | 701/209 |
| 2002/0164998 A1 | 11/2002 | Younis | 455/456 |
| 2003/0007261 A1* | 1/2003 | Hutzel et al. | 359/838 |
| 2003/0195701 A1* | 10/2003 | Ohler | 701/209 |
| 2004/0158393 A1* | 8/2004 | Oonishi et al. | 701/201 |
| 2004/0204032 A1* | 10/2004 | Hisano et al. | 455/552.1 |
| 2005/0125148 A1* | 6/2005 | Van Buer et al. | 701/209 |
| 2006/0111835 A1* | 5/2006 | Baker et al. | 701/207 |
| 2007/0038372 A1* | 2/2007 | Kudo et al. | 701/211 |

* cited by examiner

APPARATUS, SYSTEM, AND METHOD FOR AUTONOMOUSLY DETERMINING A SET OF DESTINATIONS

BACKGROUND OF THE INVENTION

1. Field of the Invention

This invention relates to determining a destination and more particularly relates to autonomously determining a set of destinations.

2. Description of the Related Art

Automotive global position systems (GPS) are useful for helping a driver navigate to a destination he is not familiar with, and in finding his way when lost. The GPS receives navigation signals from three or more satellites in geosynchronous orbit. Using the navigation signals, the GPS calculates its position. The GPS may also calculate a direction of travel from two or more positions.

The GPS may display the driver's current location and/or the destination, as well as intervening streets and landmarks. The driver can use the information provided by the GPS to navigate to his destination. For example, the driver may view an instruction from the GPS to exit a freeway at an upcoming exit.

Unfortunately, the driver must typically view the display of the GPS to receive the navigation information provided by the GPS. Viewing the display can be difficult and dangerous while driving. For example, the driver may be unable to locate the streets where he must turn on a GPS display because of the demands of driving in heavy traffic.

Difficult driving conditions such as night, rain, and fog may also obscure landmarks, causing the driver to overshoot turns that are indicated by the GPS. For example, the GPS may direct the driver to turn right on Elm Street. However, the driver will be unable to follow the GPS directions if he cannot see the sign for Elm Street.

In addition, the destination must be previously programmed into the GPS for the driver to use the GPS to navigate to the destination. Otherwise the driver must exit traffic, park, and program the GPS. Programming the GPS with the destination while driving is difficult and dangerous. Unfortunately, the driver might not always want to or be able to preprogram the GPS or to stop and program the GPS while driving.

SUMMARY OF THE INVENTION

From the foregoing discussion, there is a need for an apparatus, system, and method that autonomously determine a set of destinations. Beneficially, such an apparatus, system, and method would determine a destination for a driver and provide audible navigation prompts to the driver for navigating to the destinations.

The present invention has been developed in response to the present state of the art, and in particular, in response to the problems and needs in the art that have not yet been fully solved by currently available automotive GPS. Accordingly, the present invention has been developed to provide an apparatus, a system, and a method for autonomously determining a set of destinations that overcome many or all of the above-discussed shortcomings in the art.

The apparatus to autonomously determine a set of destinations is provided with a plurality of modules configured to functionally execute the steps of storing a plurality of landmarks, identifying a current location and direction, determining a destination, and audibly prompting a driver. These modules in the described embodiments include a landmark module, an identification module, a destination module, and a prompt module. The apparatus may further include a navigation module, and a classification module.

The landmark module stores a plurality of landmarks from a database. In an embodiment, the landmark module stores a plurality of landmarks comprising landmarks passed by a vehicle within a specified time interval. In another embodiment, the landmark module stores a plurality of landmarks comprising landmarks passed by the vehicle with a specified interest distance from the vehicle. The identification module identifies a first current location and direction of the vehicle.

The destination module determines a first set of destinations from the plurality of landmarks, the first current location, and the first current direction of the vehicle. The prompt module audibly prompts a driver to navigate the vehicle to the first set of destinations.

In one embodiment, the navigation module determines if the driver is navigating toward at least one destination of the first set of destinations. Alternatively, in response to the driver not navigating the vehicle toward at least one destination of the first set of destinations, the navigation module may direct the identification module to identify a second current location and direction of the vehicle, the destination module to determine a second set of destinations, and the prompt module to audibly prompt the driver to navigate the vehicle to the second set of destinations. The classification module may classify at least one location if the vehicle is regularly parked in the at least one location during at least one specified time block.

A system of the present invention is also presented for autonomously determining a set of destinations. The system may be embodied in a global positioning system. The system includes a global positioning device, a database, a help button, a memory module, and a processor. The processor includes a landmark module, an identification module, a destination module, and a prompt module. In particular, the processor, in other embodiments, includes a navigation module, and a classification module.

The help button issues a help command in response to a driver depressing the help button. The global positioning device determines locations. The database stores landmarks. The memory module stores processor readable programs. The processor executes the processor readable programs. The processor readable programs may include the landmark module, the identification module, the destination module, and the prompt module.

The landmark module stores a plurality of landmarks from the database, the landmarks comprising landmarks passed by a vehicle within a specified time interval and landmarks with a specified interest distance from the vehicle. The identification module identifies a first current location and direction of the vehicle. In response to receiving the help command from the help button, the destination module determines a first set of destinations from the plurality of landmarks, the first current location, and the first current direction. The prompt module audibly prompts a driver to navigate the vehicle to the first set of destinations.

The navigation module may determine if the driver is navigating toward at least one destination of the first set of destinations. In one embodiment, if the driver is not navigating the vehicle toward at least one destination of the first set of destinations, the navigation module directs the identification module to identify a second current location and direction of the vehicle, the destination module to determine a second set of destinations from the plurality of landmarks, the second current location, and the second current direction, and the prompt module to audibly prompt the driver to navigate the vehicle to the second set of destinations. In an embodiment, the classification module classifies at least one location if the vehicle is regularly parked in the at least one location during at least one specified time block.

A method of the present invention is also presented for autonomously determining a set of destinations. The method in the disclosed embodiments substantially includes the steps to carry out the functions presented above with respect to the operation of the described apparatus and system. In one embodiment, the method includes storing a plurality of landmarks, identifying the first current location and direction of the vehicle, determining a first set of destinations, and audibly prompting a driver to navigate the vehicle to the first set of destinations. The method also may include identifying a second current location and direction of the vehicle, and determining a second set of destinations. In other embodiments, the method includes classifying at least one location of destination.

The landmark module stores a plurality of landmarks from a database. In an embodiment, the landmark module stores a plurality of landmarks comprising landmarks passed by a vehicle within a specified interval. The specified interval may be a time interval prior to a stop interval. In another embodiment, the specified interval is a distance interval prior to a stop interval. The landmark module may store a plurality of landmarks comprising landmarks passed by the vehicle with a specified interest distance from the vehicle. In a certain embodiment, the specified interest distance is calculated as a landmark's interest weight divided by a distance to the landmark. The identification module identifies the first current location and direction of the vehicle. In a certain embodiment, the identification module identifies the first current location, and direction of the vehicle.

In response to receiving a help command from the help button, the destination module determines a first set of destinations from the plurality of landmarks, the first current location, and the first current direction of the vehicle. The prompt module audibly prompts the driver to navigate the vehicle to the first set of destinations. In one embodiment, the navigation module determines if the driver is navigating toward at least one destination of the first set of destinations.

In response to the driver not navigating the vehicle toward at least one destination of the first set of destinations, the navigation module may direct the identification module to identify a second current location, and direction of the vehicle, the destination module to determine a second set of destinations, and the prompt module to audibly prompt the driver to navigate the vehicle to the second set of destinations. The classification module may classify at least one location if the vehicle is regularly parked in the at least one location during at least one specified time block.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for autonomously determining a set of destinations. Beneficially, such an apparatus, a system, and a method allow a GPS to autonomously determine a destination when a driver depresses a help button. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
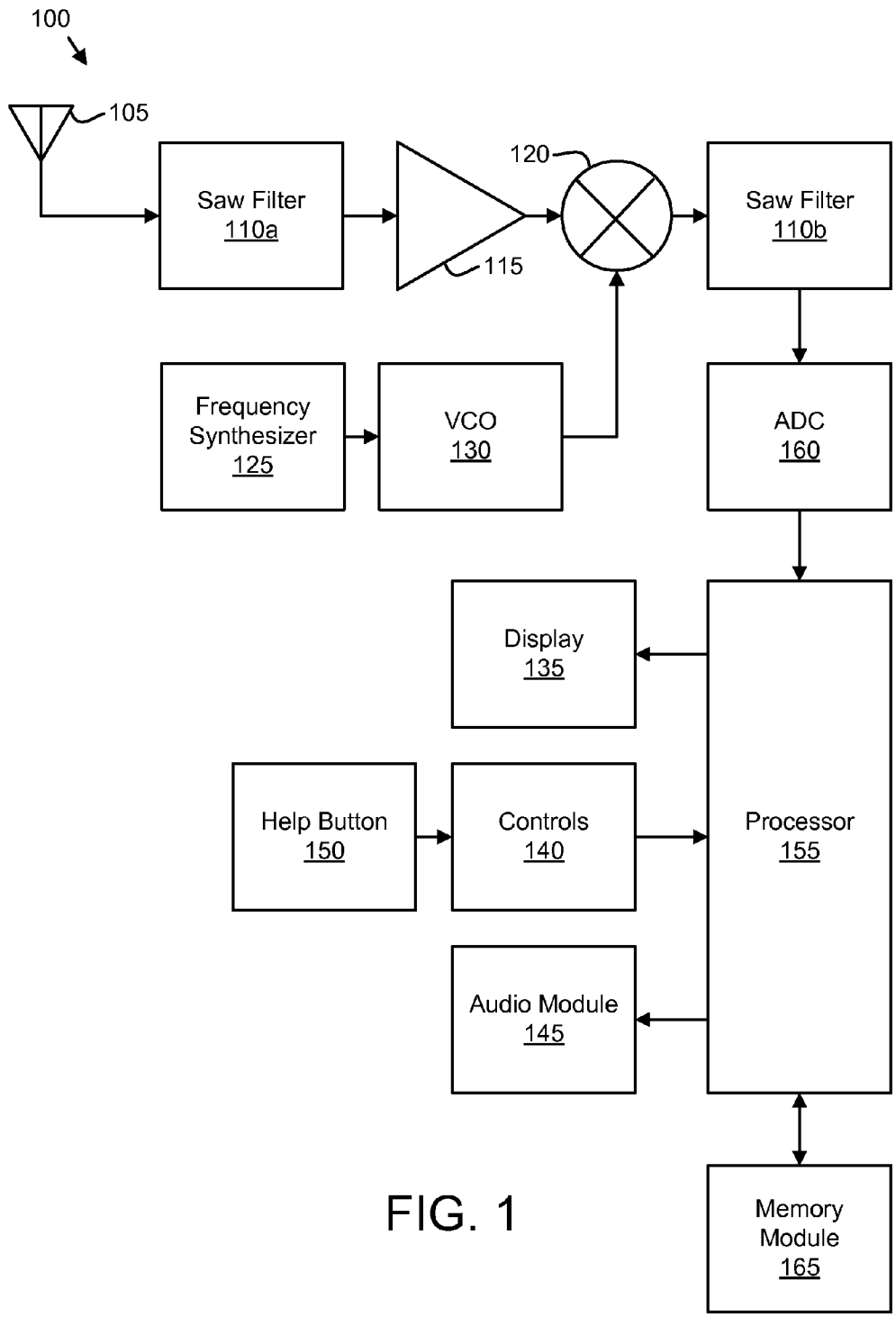
FIG. 1 is a schematic block diagram illustrating one embodiment of a system for autonomously determining a set of destinations in accordance with the present invention.

FIG. 1 is a schematic block diagram illustrating one embodiment of a system 100 for autonomously determining a set of destinations. The system 100 may be embodied in a global positioning device. The system 100 includes a memory module 165, a help button 150, a processor 155, a display 135, an audio module 145, an analog-to-digital converter (ADC) 160, one or more surface acoustic wave (SAW) filters 110, an amplifier 115, a voltage-controlled oscillator (VCO) 130, an antenna 105, and a frequency synthesizer 125. Although in FIG. 1, two (2) SAW filters 110 and one (1) of all other electronic parts are shown, any number of those may be used in the system 100. The SAW filters 110, the amplifier 115, the frequency synthesizer 125, may be configured in a Low Noise Block (LNB), mounted for example at the focus of a parabolic dish.

The processor 155 may execute the software instructions and manipulate digital data. The processor 155 may communicate with the display 135, help button 150, and the audio module 145. The communication may be through cables, printed circuit board traces, and the like. The processor 155 may also communicate with memory module 165 to store and/or retrieve data. The communication may be through cables, printed circuit board traces, and the like and may be bi-directional.

The antenna 105 of the system 100 communicates with at least three geosynchronous satellites to receive position information in the form of signals. In an example, the antenna 105 may receive codes in the form of radio signals of two gigahertz (2 GHz).

The antenna 105 may transmit the signals to the first SAW filter 110a. The first SAW filter 1110a may convert the desired frequencies of the signals into an electrical signal of an analog voltage. For example, the first SAW filter 110a may convert the decoded radio signals into an analog voltage with a typical of one peak volt (1 V). The amplifier 115 receives the analog voltage and amplifies the analog voltage. For example, the amplifier 115 may amplify the analog voltage to a typical peak voltage of two volts (2 V). Any type of antenna 105, SAW filter 110, and amplifier 115, and the like known to those skilled in the art may be used in the LNB of system 100.

A tuner comprising the frequency synthesizer 125 and the VCO 130 may deliver a tuning signal, which allows a summer 120 to frequency-transpose the working bandwidth so that a frequency selected from this bandwidth lies around a pre-defined intermediate frequency. A second, more selective, SAW filter 110b may remove the other frequencies if any present in the working bandwidth. The VCO 130 may deliver a signal of frequency Fosc, for example equal to fifteen point five gigahertz (15.5 GHz), which makes it possible to obtain a signal output from the LNB having the same spectral width but transposed to a frequency more favorable to transmission. For example, the signal transmitted to the ADC 160 is between 1.9 and 3.5 GHz.

The ADC 160 may be an electronic circuit that converts an analog signal from the second SAW filter 110b to discrete digital numbers. The digital output from the ADC 160 may be transferred to the processor 155 using different coding schemes, such as binary and two's complement binary. The processor 155 may communicate with the memory module 165 to store the data for landmarks comprising landmarks passed by a vehicle within a specified time interval and landmarks with a specified interest distance from the vehicle. The memory module 165 may also store software instructions.

In response to a driver depressing the help button 150, the help button 150 issues a help command. One or more controls 140 may communicate with processor 155 to transfer the help command in the form of digital signals. The communication between the processor 155, the help button 150, and controls 140 may be through cables, printed circuit traces, or the like.

The processor 155 may communicate with the audio module 145 to audibly prompt the driver to navigate the vehicle to the destination. Additionally, the processor 155 may communicate with the display 135 to display the navigation prompts, either with a displayed statement of the audible instruction to the driver and/or with the help of a pointer arrow pointing at a displayed rout map of a particular region in which the vehicle is moving. The audio module 145 may be configured with one or more speakers and the display 135 may be the like known to those skilled in the art.

Figure 2:
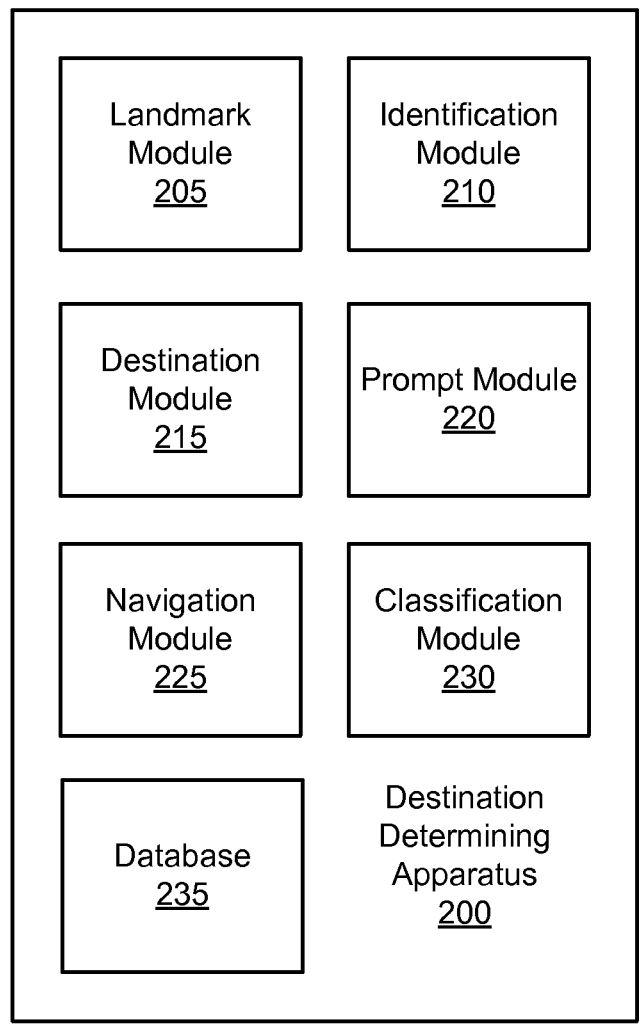
FIG. 2 is a schematic block diagram illustrating one embodiment of a destination determining apparatus of the present invention.

FIG. 2 is a schematic block diagram illustrating one embodiment of a destination apparatus 200. The apparatus 200 autonomously determines destination and can be embodied in the system 100 of FIG. 1. The description of the apparatus 200 refers to elements of FIG. 1, like numbers referring to like elements. The apparatus 200 includes a landmark module 215, an identification module 210, a destination module 215, a database 235, and a prompt module 220. The apparatus 200 may further include a navigation module 225, and a classification module 230.

The landmark module 205 stores a plurality of landmarks from a database 235. The database 235 may be configured as data in the memory module 165 and/or data stored in memory of a DVD or the like as is well known to those skilled in the art. The database may include landmarks organized by location. In one embodiment, the landmark module 205 stores a plurality of landmarks comprising landmarks passed by a vehicle within a specified interval. The specified interval may be a time interval before a stop interval. For example, the driver may park the vehicle at 10 a.m., beginning the stop interval. An hour before 10 a.m. may be the specified interval. The landmark module 205 may automatically store that the vehicle passed landmarks such as a four lane main road-X connecting city-Z in the East and city-Y in the West direction at 9.15 a.m., and/or a parking place-W at 9.30 a.m. on the same road, in the time interval of 9-10 a.m.

In another embodiment, the landmark module 205 stores a plurality of landmarks comprising landmarks passed by the vehicle with a specified interest distance from the vehicle. For example, the interest distance may be seven (7) miles. The landmark module 205 may automatically store landmarks such as a hospital-H, the parking lot-W, and/or an office-B passed within seven (7) miles by the vehicle before stopping the vehicle at 10 a.m.

The identification module 210 identifies a first current location and direction of the vehicle using a global positioning device such as the system of FIG. 1. For example, the identification module 210 may identify that the vehicle is on the main road-X as the first current location of the vehicle.

The destination module 215 determines a first set of destinations from the plurality of landmarks, the first current location, and the first current direction of the vehicle. For example, the destination module 215 may determine the parking lot-W and the main road-X as the first set of destinations. The prompt module 220 audibly prompts a driver to navigate the vehicle to the first set of destinations. For example, the prompt module 220 may audibly prompt the driver to navigate the vehicle to the first set of destinations by issuing an audible instruction through audio module 145 "Turn left at the first corner to proceed to the parking lot. Turn right at the first corner to proceed to the main road." Additionally, the apparatus 200 may display the message as a written statement of the audible instruction and/or a route map of the region on the display 135 with a first pointer arrow pointing at the parking lot-W and a second pointer arrow pointing to the main road-X, indicating the destinations.

In one embodiment, the navigation module 225 determines if the driver is navigating toward at least one destination of the first set of destinations. Continuing the example above, the navigation module 225 may determine that the driver is navigating the vehicle to the parking lot-W if the driver turns left at the first corner. Similarly, the navigation module 225 may determine that the driver is navigating to the main road-W if the driver turns right at the first corner. In one embodiment, the navigation module 225 may remove destinations that the driver is not navigating toward from the set of destinations.

In one embodiment, the navigation module 225 determines that the driver is not navigating toward any destination of the first set of destinations. In response to the driver not navigating the vehicle toward at least one of the first set of destinations, the navigation module 225 may direct the identification module 210 to identify a second current location and direction of the vehicle, the destination module 215 to determine a second set of destinations from the plurality of landmarks, the second current location, and the second current direction, and the prompt module 220 to audibly prompt the driver to navigate the vehicle to the second set of destinations.

For example, if the driver is not navigating the vehicle toward the parking lot-W and/or the main road-X, the identification module 210 may identify that the vehicle is near to the parking place-W and the destination module 215 may determine the office-B as the second set of destinations. The prompt module 220 may audibly prompt the driver to navigate the vehicle to the office-B and hospital-H by issuing an audible and/or visual instruction.

The classification module 230 may classify at least one location if the vehicle is regularly parked in the at least one location during at least one specified time block. For example, if the vehicle is regularly parked during the evening block of 9 p.m. to 9.30 a.m., in the parking lot-W, the classification module 230 may classify the parking lot-W as a home location. In an embodiment, the classification module 230 classifies the at least one location by storing parked locations during a specified time block, ranking the parked locations by frequency, determining a high ranked parked location that satisfies a classification criteria, and classifying the high ranked location. For example, the classification module 230 may store the office-B and/or parking lot-W during a daytime block of 8 a.m. to 10 p.m., rank the office-B as first and the parking lot-W as second, determine the office-B satisfies the selection criteria, and classify the office-B. The apparatus 200 determines a destination so that the driver need not program a global positioning device with a destination.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
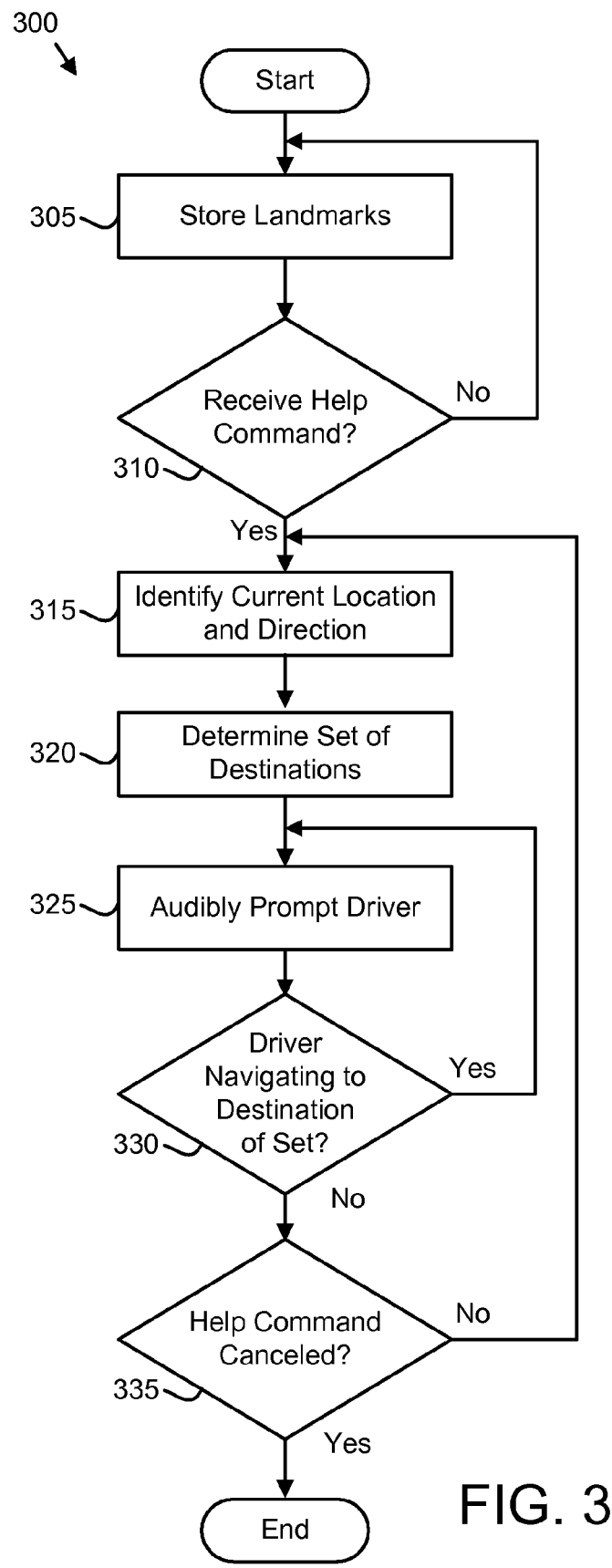
FIG. 3 is a schematic flow chart illustrating one embodiment of a destination determination method of the present invention.

FIG. 3 is a schematic flow chart illustrating one embodiment of a destination determination method 300 of the present invention. The method 300 substantially includes the steps to carry out the functions presented above with respect to the operation of the described apparatus 200 and system 100 of FIGS. 2 and 1 respectively. The description of the method 300 refers to elements of FIGS. 1-2, like numbers referring to the like elements. In one embodiment, the method 300 is implemented with a processor program product comprising a processor readable medium having a processor readable program. The processor 155 executes the processor readable program.

The method 300 begins, and in an embodiment, the landmark module 205 stores 305 a plurality of landmarks from the database 235. In one embodiment, the landmark module 205 automatically stores 305 the plurality of landmarks comprising landmarks passed by a vehicle within a specified interval. The specified interval may be a time interval before a stop interval. For example, the driver may park the vehicle at 8 p.m., beginning a stop interval. An hour before 8 p.m. may be the specified time interval. The landmark module 205 may automatically store landmarks that the vehicle passed from such as a freeway-X connecting city-Z in the North and city-Y in the West direction at 7.15 p.m., and/or a street road-S at 7.30 p.m. passed by the vehicle during the time interval of 7-8 p.m.

Additionally, the landmark module 205 may store 305 a plurality of landmarks comprising landmarks passed by the vehicle with a specified interest distance from the vehicle. In an embodiment, the landmark module 205 automatically determines the interest distance for a landmark using Equation 1, where i is the interest distance, w is an interest weight assigned to the landmark, and d is a distance from the vehicle to the landmark.

$$i = \frac{w}{d} \qquad \text{Equation 1}$$

For example, the landmark module 205 may assign interest weight on a ten (10) point scale to each landmark. If the vehicle passed the office-B A one hundred (100) times or more, the landmark module 205 may assign interest weight ten (10) to the office-B. Similarly, the landmark module 205 may assign interest weight equal to one (1), if the vehicle passed the landmark five (5) times or less. Alternatively, the database 235 may assign an interest weight to each landmark. The landmark module 205 may automatically calculate a distance of the landmark using the global positioning device and/or the database 235. For example, the landmark module 205 may calculate that the office-B is 10 miles away from the vehicle. Using the interest weight and the distance, the landmark module 205 may calculate the interest distance using Equation 1.

In one embodiment, the landmark module 205 stores 305 landmarks that exceed a specified interest distance threshold. The interest distance threshold may be zero point five (0.5) or more. For example, the landmark module 205 may store 305 the office-B if the interest distance threshold is zero point five (0.5) or more. Landmarks with higher interest distance values are near to the vehicle and/or have high interest weight. In another example, the landmark module 205 may automatically store landmarks such as a government office-G, the main road-X, a street-S, and/or a home-A passed by the vehicle, if the calculated interest distance is zero point five (0.5) or more.

The processor 155 determines 310 if a help command is received. If the help command is received, the processor 155 may initiate identifying 315 a first current location and direction. Otherwise, the landmark module 205 continues storing 305 the landmarks.

On receiving the help command, the identification module 210 identifies 315 a first current location and direction of the vehicle using a global positioning system and/or stored information in the database 235. For example, the identification module 210 may identify 315 that the vehicle is near to the main road-X as the first current location of the vehicle and that the vehicle is north-bound as a first current direction.

The destination module 215 determines 320 a first set of destinations from the plurality of landmarks, the first current location, and the first current direction of the vehicle. For example, the destination module 215 may include the home-A and the hospital-H in the first set of destinations. In an embodiment, the processor 155 may select the first set of destinations from a home location, an office location, a main road, and a back track location. For example, the processor 155 may select the home-A for the first set of destinations because the home-A is classified as a home location and the hospital-H because the hospital-H is classified as a back track location. The destinations need not be in the current direction of travel. For example, the destination module 215 may select a recently visited landmark as a destination, so that if the driver is navigating in the wrong direction, the driver can follow prompts to reverse course.

The prompt module 220 audibly prompts 325 a driver to navigate the vehicle to the first set of destinations. For example, the prompt module 220 may audibly prompt 325 the driver to navigate the vehicle to the first set of destinations by issuing an audible instruction through audio module 145 "You are approaching Exit 123. If you are going to the hospital, please leave the road at Exit 123. If you are going home, please remain on this road." Additionally, the message may be displayed as a written statement of the audible instruction and/or a route map of the region on the display 135 with pointer arrows pointing at the hospital-H and the home-A, indicating the destinations. In another embodiment, the prompt module 220 may audibly identify 315 approaching roads. For example, the prompt module 220 may audibly identify 315 the street-S.

In one embodiment, the navigation module 225 determines 330 if the driver is navigating toward the first set of destinations. For example, the navigation module 225 may determine 330, if the driver is navigating the vehicle to the home-A. If the navigation module 225 determines 330 that the driver is not navigating the vehicle toward a destination of the first set of destinations, the navigation module 225 may direct the identification module 210 to identify 315 a second current location and direction of the vehicle, the destination module 215 to determine 320 a second set of destinations from the plurality of landmarks, the second current location, and the second current direction, and the prompt module 220 to audibly prompt 325 the driver to navigate the vehicle to the second set of destinations. For example, if the driver is not navigating the vehicle toward the home-A and/or hospital-H, the identification module 210 may identify 315 that the vehicle is near to the freeway-X and include the street-S and the city-Y in the second set of destinations. The prompt module 220 may audibly prompt 325 the driver to navigate the vehicle to the street-S and city-Y by issuing an audible and/or visual instruction.

Figure 4:
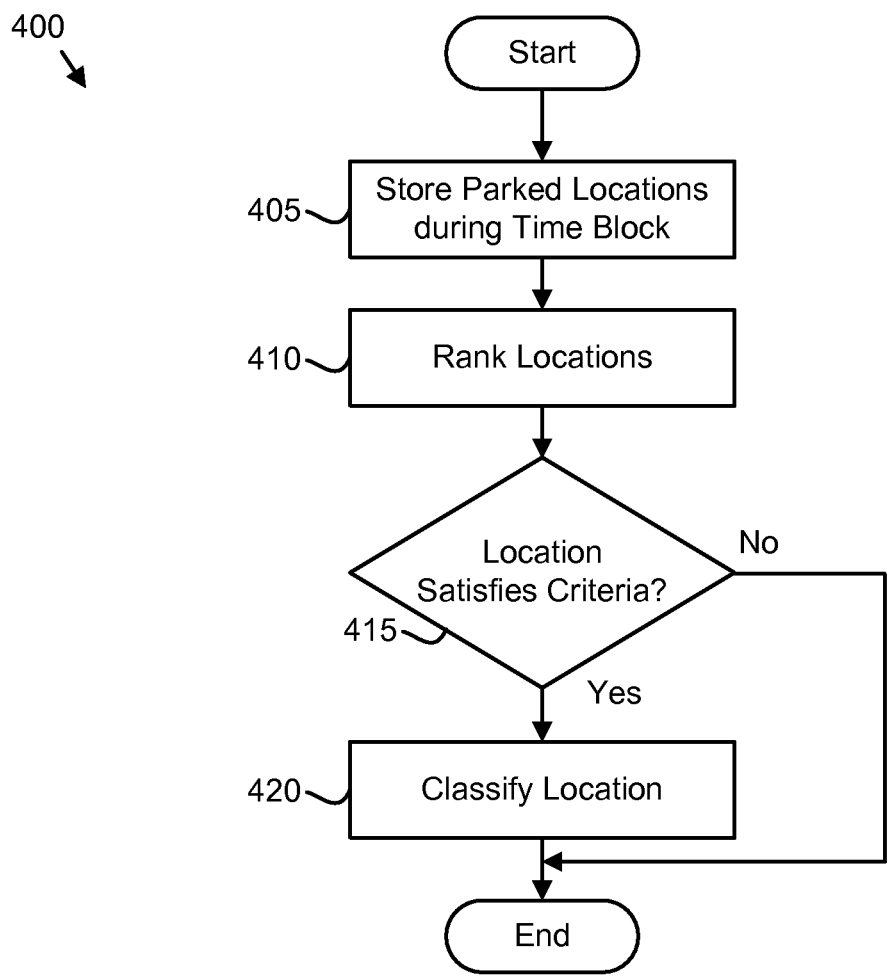
FIG. 4 is a schematic flow chart illustrating one embodiment of a method for classifying location of the destination of the present invention.

FIG. 4 is a schematic flow chart illustrating one embodiment of a method 400 for classifying a location of the destination of the present invention. The method 400 substantially includes the steps to carry out the functions presented above with respect to the operation of the described apparatus 200, system 100, and method 300 of FIGS. 2, 1, and 3 respectively. The description of method 400 refers to elements of FIG. 1-3, like numbers referring to the like elements. In one embodiment, the method is implemented with a processor program product comprising a processor readable medium having a processor readable program. The processor 155 executes the processor readable program.

The method 400 begins and in an embodiment, the classification module 230 stores 405 parked locations during a specified time block. The specified time block may be an evening time block and/or a daytime time block. For example, the classification module 230 may store 405 a home-A, and/or an office-B as parked locations during the evening time block of 8 p.m. to 10 a.m., and the daytime block of 10 a.m. to 8 p.m. respectively.

The classification module 230 may rank 410 the parked location by frequency of parking the vehicle. For example, in a week, if the vehicle is parked six (6) times at the home-A, and one (1) time at office-B in the evening time block of 8 p.m. to 10 a.m., the classification module 230 may rank 410 the home-A as a first location, and the office-B as the second location in the evening time block.

The classification module 230 may determine 415 a high ranked parked location satisfies classification criteria. For example, the classification criteria may be satisfied if the frequency of parking the vehicle at the high ranked location is five (5) times or more in a week. In another example, the classification module 230 may determine 415 the home-A satisfies classification criteria, if vehicle is parked six (6) times in a week at the home-A in the evening time block of 8 p.m. to 10 a.m.

The method 400 terminates if the high ranked parked location does not satisfy the classification criteria. If the classification module 230 determines 415 that the high ranked parked location satisfies the classification criteria, the classification module 230 classifies 420 the high ranked location. In an embodiment, the home-A high ranked location is classified as the home location in the specified evening block. For example, the classification module 230 may classify 420 the home-A in the evening time block of 8 p.m. to 10 a.m. In another embodiment, the high ranked location is classified as an office location in the daytime block. For example, the classification module 230 may classify 420 the office-B in the daytime block of 10 a.m. to 8 p.m. as an office location.

Figure 5:
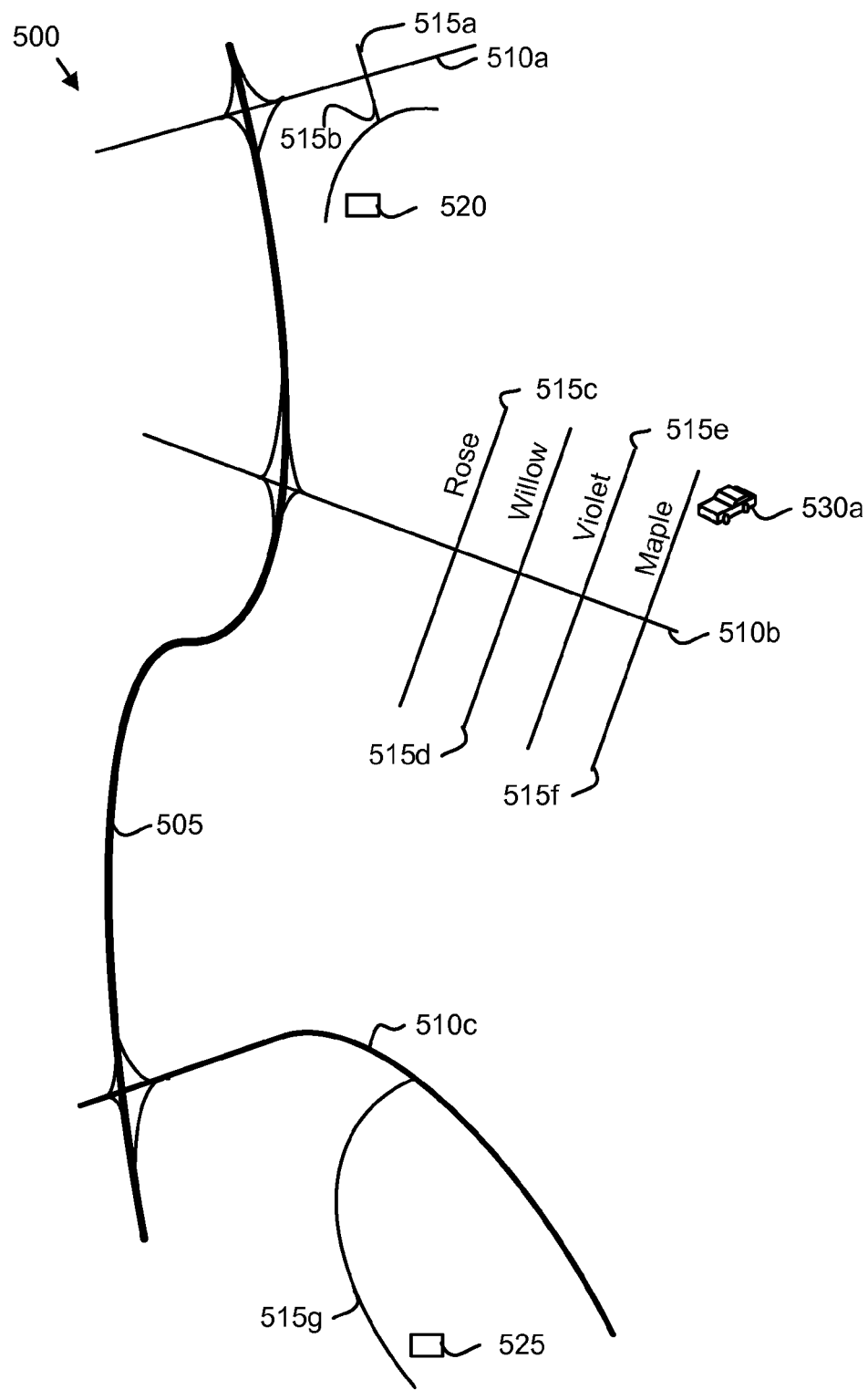
FIG. 5 is a schematic map illustrating one embodiment of autonomous destination determination in accordance with the present invention.

FIG. 5 is a schematic map 500 illustrating one embodiment of autonomous destination determination in accordance with the present invention. The map 500 substantially illustrates a plurality of major roads 510, a plurality of minor roads 515, a freeway 505, an office 520, a home 525, and a vehicle 530. The map 500 illustrates the functions of the system 100, apparatus 200, and the method 300 in accordance with the present invention. The description of the map 500 refers to the elements of FIGS. 1-4, like numbers referring to the like elements.

In one embodiment, the map 500 illustrates the vehicle 530 near to a minor road 'Maple' 515f. For example, the driver may park the vehicle at 10.30 a.m. near the minor road 'Maple' 515f, beginning the stop interval. The landmark module 205 may store 305 landmarks passed by the vehicle 530 such as the freeway 505 at 10:15 a.m., a major road 510b at 10:20 a.m., a minor road 'Rose' 515c at 10:25 a.m., a minor road 'Willow' 515d at 10:26 a.m., a minor road 'Violet' 515e at 10:27 a.m., and the minor road 'Maple' 515f at 10:28 a.m. Additionally, the landmark module 205 may store 305 an office 520 as a landmark within an interest distance of 20 (twenty) miles from the vehicle 530.

In response to the driver depressing the help button 150, the processor 155 may receive the help command and communicate with the identification module 210. The identification module 210 may identify 315 that the vehicle 530 is moving in a South West direction and on the minor road 'Maple' 515f. The destination module 215 may determine 320 the office 520 as a destination. The prompt module 220 may audibly prompt 325 the driver to navigate the vehicle to the freeway 505 and the office 520 by issuing audible instructions to navigate to the major road 510b and the freeway 505.

Figure 6:
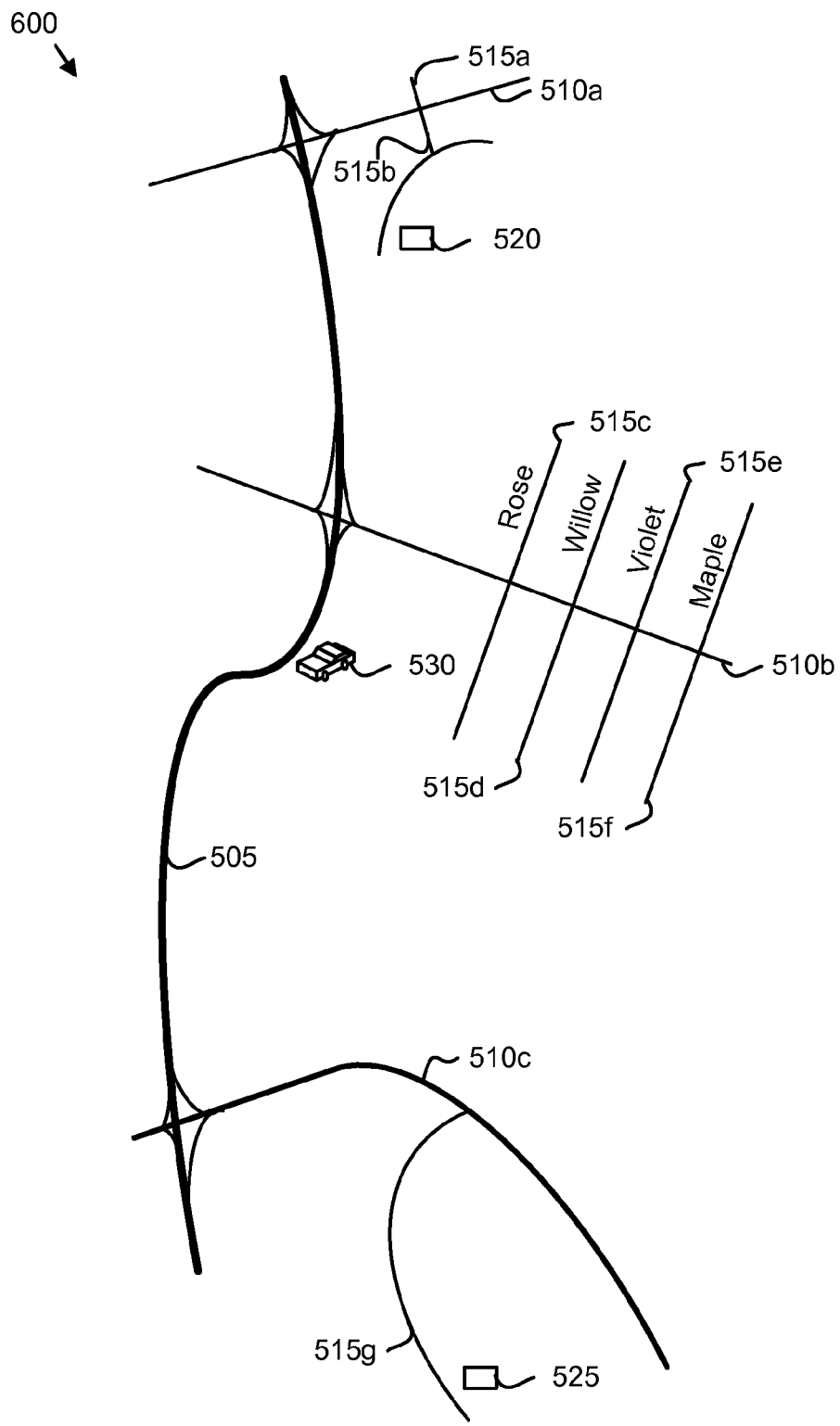
FIG. 6 is a schematic map illustrating one additional embodiment of autonomous destination determination in accordance with the present invention.

FIG. 6 is a schematic map 600 illustrating one additional embodiment of autonomous destination determination in accordance with the present invention. The map 600 substantially illustrates the plurality of major roads 510, plurality of minor roads 515, freeway 505, office 520, home 525, and vehicle 530 described in FIG. 5 to explain the functions of the system 100, apparatus 200, and the method 300 of FIGS. 1-5. The description of the map 600 refers to the elements of FIGS. 1-5, like numbers referring to the like elements.

Continuing the example of FIG. 5, the map 600 illustrates the vehicle 530 near on freeway 505 and moving away from the office 520, although the apparatus 200 selected the freeway 505 and the office 520 for the first set of destinations. The navigation module 225 may determine 330 that the driver is not navigating the vehicle toward the office 420 and that the vehicle is on the freeway 505 and so is not navigating to the freeway 505. The navigation module 225 may direct the identification module 210 to identify 315 a second current location and direction of the vehicle, the destination module 215 to determine 320 a second set of destinations such as the home 525, and the prompt module 220 to audibly prompt 325 the driver to navigate the vehicle to the home 525 until the driver deactivates the help button 150.

The present invention provides an apparatus, a system, and a method for autonomously determining a destination. Beneficially, such an apparatus, a system, and a method allow a GPS to autonomously determine a set of destinations when a driver depresses a help button and audibly prompt the driver to the destinations. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to autonomously determine and guide a driver to potential destinations, the apparatus comprising:
    a landmark module configured to store a plurality of landmarks from a database, the landmarks comprising one or more of landmarks passed by a vehicle within a specified interval, landmarks where the vehicle has stopped for a specified time period, and landmarks with a specified interest distance from the vehicle;
    an identification module configured to identify a first current location and a first current direction of the vehicle;
    a destination module configured to, in response to the first current location and direction of the vehicle, autonomously determine a first plurality of potential destinations, the first plurality of potential destinations determined from the plurality of landmarks, the first current location, and the first current direction; and
    a prompt module configured to audibly prompt a driver with an audible navigation prompt for each of the first plurality of potential destinations, at least one audible navigation prompt thereof comprising a turning instruction for driving to a particular destination of the plurality of potential destinations
    wherein the identification module, destination module, and prompt module are responsive to a user issuing a help command by one or more of pushing a help button and verbally selecting the help command and the destination module is configured to determine the plurality of potential destinations while the apparatus is operating currently without the user programming the apparatus with a destination, wherein the landmark module, the identification module, the destination module, and the prompt module comprise of a logic hardware.

2. The apparatus of claim 1, further comprising a navigation module configured to determine if the driver is navigating toward any of the first plurality of potential destinations and to direct the identification module to identify a second current location and direction of the vehicle, the destination module further configured to receive the second current location and direction of the vehicle and autonomously determine a second plurality of potential destinations from the plurality of landmarks, the second current location, and the second current direction, and the prompt module further configured to audibly prompt the driver with an audible navigation prompt for each of the second plurality of potential destinations.

3. The apparatus of claim 1, wherein the landmark module is configured to store the plurality of landmarks independent of the user programming the apparatus with a destination.

4. A processor program product comprising a processor useable medium having a processor readable program, wherein the processor readable program when executed on a processor causes the processor to:
    store a plurality of landmarks from a database, the landmarks comprising one or more of landmarks passed by a vehicle within a specified interval, landmarks where the vehicle has stopped for a specified time period, and landmarks with a specified interest distance from the vehicle;

identify a first current location and a first current direction of the vehicle;

in response to the first current location and direction of the vehicle, autonomously determining a first plurality of potential destinations, the first plurality of potential destinations determined from the plurality of landmarks, the first current location, and the first current direction; and audibly prompt a driver with an audible navigation prompt for each of the first plurality of potential destinations, at least one audible navigation prompt thereof comprising a turning instruction for driving to a particular destination of the plurality of potential destinations wherein the identifying a first current location and a direction of the vehicle, determining a first plurality of potential destinations, and prompting the driver are responsive to a user issuing a help command by one or more of pushing a help button and verbally selecting the help command and wherein determining the plurality of potential destinations occurs while the apparatus is operating currently without the user programming the apparatus with a destination.

5. The processor program product of claim 4, wherein the processor readable code is further configured to cause the processor to identify a second current location and direction of the vehicle, and receive the second current location and direction of the vehicle and autonomously determine a second plurality of potential destinations from the plurality of landmarks, the second current location, and the second current direction, and audibly prompt the driver with an audible navigation prompt for each of the second plurality of potential destinations.

6. The processor program product of claim 4, wherein the processor readable code is further configured to cause the processor to classify at least one location if the vehicle is regularly parked in the at least one location during at least one specified time block.

7. The processor program product of claim 6, wherein the processor readable code is further configured to cause the processor to classify the at least one location by:
storing parked locations during a specified time block;
ranking the parked locations by frequency;
determining a high ranked parked location satisfies a classification criteria; and
classifying the high ranked location.

8. The processor program product of claim 6, wherein the specified time block is an evening time block and the high ranked location is classified as a home location.

9. The processor program product of claim 6, wherein the specified time block is a daytime block and the high ranked location is classified as an office location.

10. The processor program product of claim 4, wherein the processor readable code is further configured to cause the processor to select the first set of destinations from a home location, an office location, a main road, and a back track location.

11. The processor program product of claim 4, wherein the specified interval is one of a time interval prior to a stop interval and a distance interval prior to a stop interval.

12. The processor program product of claim 4, wherein the specified interval is a time interval and wherein the landmarks comprise landmarks passed by a vehicle within the specified time interval.

13. The processor program product of claim 4, wherein the processor readable code is further configured to cause the processor to audibly identify approaching roads.

14. The processor program product of claim 4, wherein the specified interest distance is calculated as a landmark's interest weight divided by a distance to the landmark.

15. A system to autonomously determine and guide a driver to potential destinations, the system comprising:
a global positioning device configured to determine locations for a vehicle;
a database configured to store landmarks;
a help button configured to issue a help command in response to a driver depressing the help button;
a memory module configured to store processor readable programs;
a processor configured to execute the processor readable programs and comprising:
a landmark module configured to store a plurality of landmarks from the database, the landmarks comprising one or more of landmarks passed by a vehicle within a specified interval, landmarks where the vehicle has stopped for a specified time period, and landmarks with a specified interest distance from the vehicle;
an identification module configured to identify a first current location and a first current direction of the vehicle;
a destination module configured to, autonomously determine a first plurality of potential destinations from the plurality of landmarks, the first current location, and the first current direction in response to receiving the help command from the help button; and
a prompt module configured to audibly prompt the driver to navigate the vehicle to the first set of destinations with an audible navigation prompt for each of the first plurality of potential destinations, at least one audible navigation prompt thereof comprising a turning instruction for driving to a particular destination of the plurality of potential destinations
wherein the identification module, destination module, and prompt module are responsive to the user pushing the help button and the destination module is configured to determine the plurality of potential destinations while the apparatus is operating currently without the user programming the apparatus with a destination.

16. The system of claim 15, the processor further comprising a navigation module configured to determine if the driver is navigating toward any of the first plurality of destinations and to direct the identification module to identify a second current location and direction of the vehicle, the destination module further configured to receive the second current location and direction of the vehicle and autonomously determine a second plurality of potential destinations from the plurality of landmarks, the second current location, and the second current direction, and the prompt module further configured to audibly prompt the driver with an audible navigation prompt for each of the second plurality of potential destinations.

17. A method for autonomously determining a set of destinations and guiding a user to potential destinations, the method comprising:
storing a plurality of landmarks from a database, the landmarks comprising one or more of landmarks passed by a vehicle within a specified interval, landmarks where the vehicle has stopped for a specified time period, and landmarks with a specified interest distance from the vehicle;

receiving a help command from a help button depressed by a driver;

identifying a first current location and direction of the vehicle, via a global positioning system ("GPS"),;

in response to the first current location and direction of the vehicle, autonomously determining a first plurality of potential destinations, the first plurality of potential destinations determined from the plurality of landmarks, the first current location, and the first current direction;

audibly prompting the driver with an audible navigation prompt for each of the first plurality of potential destinations, at least one audible navigation prompt thereof comprising a turning instruction for driving to a particular destination of the plurality of potential destinations; and determining, using a processor, if the driver is navigating toward any of the plurality of potential destinations wherein the identifying a first current location and a direction of the vehicle, determining a first plurality of potential destinations, and prompting the driver are responsive to a user issuing a help command by one or more of pushing a help button and verbally selecting the help command and wherein determining the plurality of potential destinations occurs while the apparatus is operating currently without the user programming the apparatus with a destination.

18. The apparatus of claim 1, wherein a particular potential destination of the plurality of potential destinations is not located toward a current direction of travel or on a pre-selected route and wherein the prompt module audibly prompts the driver with at least one audible navigation prompt comprising a turning instruction away from the current direction of travel, the turning instruction for driving to the particular potential destination.

* * * * *